United States Patent [19]
Blankenship et al.

[11] Patent Number: 6,139,961
[45] Date of Patent: Oct. 31, 2000

[54] HOLLOW SPHERE ORGANIC PIGMENT FOR PAPER OR PAPER COATINGS

[75] Inventors: Robert Mitchell Blankenship, Harleysville; William Christopher Finch; Lubomir Mlynar, both of Blue Bell; Barbara Jean Schultz, Pennsburg, all of Pa.

[73] Assignee: Rohm and Haas Company, Philadelphia, Pa.

[21] Appl. No.: 09/306,488

[22] Filed: May 6, 1999

Related U.S. Application Data

[60] Provisional application No. 60/085,847, May 18, 1998.

[51] Int. Cl.[7] .............................. B32B 23/12; C08J 9/16; C08J 9/22
[52] U.S. Cl. .............................. 428/402; 521/56; 521/59; 521/60; 521/65; 525/243
[58] Field of Search .............................. 428/402; 521/56, 521/59, 60, 65; 525/243

[56] References Cited

U.S. PATENT DOCUMENTS

| | | |
|---|---|---|
| 4,427,836 | 1/1984 | Kowalski et al. . |
| 4,468,498 | 8/1984 | Kowalski et al. . |
| 4,806,207 | 2/1989 | Monzon et al. . |
| 4,920,160 | 4/1990 | Chip et al. ............................. 523/201 |
| 4,972,000 | 5/1990 | Kawashima et al. ..................... 521/54 |
| 5,036,109 | 7/1991 | Chip et al. ................................. 521/57 |
| 5,045,569 | 9/1991 | Delgado ..................................... 521/60 |
| 5,053,436 | 10/1991 | Delgado ..................................... 521/64 |
| 5,284,881 | 9/1993 | Kaminaga et al. ................ 250/227.21 |
| 5,447,560 | 9/1995 | Vogel ....................................... 523/201 |
| 5,494,971 | 2/1996 | Blankenship . |
| 5,527,613 | 6/1996 | Blankenship et al. ............. 428/402.24 |
| 5,618,888 | 4/1997 | Choi et al. ............................... 525/301 |
| 5,639,805 | 6/1997 | Park et al. ............................... 523/201 |
| 5,663,213 | 9/1997 | Jones et al. ............................. 523/105 |

FOREIGN PATENT DOCUMENTS

| | | |
|---|---|---|
| 0 441 559 A2 | 2/1991 | European Pat. Off. . |
| 0 565 244 A1 | 3/1993 | European Pat. Off. . |
| WO 94/04603 | 3/1994 | WIPO . |
| WO 95/11265 | 4/1995 | WIPO . |

*Primary Examiner*—Jeffrey C. Mullis
*Attorney, Agent, or Firm*—Ronald D. Bakule

[57] ABSTRACT

A hollow sphere organic pigment in which a core containing a void is encapsulated by a first shell polymer having a glass transition temperature greater than 50° C., the first shell having polymerized thereon a second shell polymer having a glass transition temperature of −15° C. to −50° C. is provided. Also provided is a paper or paperboard coating composition containing the hollow sphere organic pigment, a method for improving the strength and opacity of a paper or paperboard coating by using the coating composition dried, a coated paper or paperboard bearing the dried coating composition, and a method for improving the strength and opacity of paper or paperboard by incorporating a particular hollow sphere organic pigment into the formed wet sheet.

7 Claims, No Drawings

HOLLOW SPHERE ORGANIC PIGMENT FOR PAPER OR PAPER COATINGS

This application claims the benefit of U.S. Provisional No. 60/085,847 filed May. 18, 1998.

This invention relates to a hollow sphere organic pigment in which a core containing a void is encapsulated by a first shell polymer having a glass transition temperature greater than 50° C., the first shell having polymerized thereon a second shell polymer having a glass transition temperature of −15° C. to −50° C. This invention also relates to a paper or paperboard coating composition containing the hollow sphere organic pigment, a method for improving the strength and opacity of a paper or paperboard coating by using the coating composition dried, a coated paper or paperboard bearing the dried coating composition, and a method for improving the strength and opacity of paper or paperboard by incorporating a particular hollow sphere organic pigment into the formed wet sheet.

Coated paper and paperboard is usually printed and the coating must exhibit a useful level of smoothness and opacity as well as sufficient strength to withstand the printing operation. Printing frequently involves the high speed application of tacky inks to the coating surface under shear conditions such that small pieces of the coating may be undesirably removed from a weak coating by the ink, thereby leaving unsightly unprinted spots on the printed product; this phenomenon is known as "picking". Other coating properties related to coating strength are rub resistance, abrasion resistance, folding resistance, and linting resistance. Coating opacity and strength (as indicated by pick resistance herein) are primarily effected by the selection of and amounts of polymeric binder and pigments to be used in the coating with some contribution from the coating application, drying, and finishing methods used. Higher levels of opacity and strength are desired.

U.S. Pat. No. 4,427,836 discloses the production and use in coating compositions of microvoid-containing, opacifying particles made by sequential emulsion polymerization. In one modification, acidic core/sheath particles having a Ti of 50° C. or higher and/or a crosslinked sheath layer are disclosed to be provided with an outer uncrosslinked relatively softer, film-forming layer having a Ti of about 17° to 20° C. or lower; such particles are disclosed to be useful in water-base house paints or industrial coatings.

The problem faced by the inventors is the provision of a method for improving the strength and opacity of a paper or paperboard coating. While opacifying particles with a soft outermost shell have been disclosed for use in coatings, and while the film formation characteristics of a coating would be expected to be good at a Ti or glass transition temperature ("Tg") of the outermost polymer below the temperature at which the film is formed, coatings containing softer (lower Tg) binders would be expected to be generally weaker. We have now found that the strength of a paper or paperboard coating is unexpectedly improved and the opacity retained relative to previously disclosed coatings containing hollow sphere pigments when the Tg of the second shell polymer has a Tg from −15° C. to −50° C. and when the second shell polymer is at least 15% by weight of the total weight of the first shell polymer and the second shell polymer.

STATEMENT OF THE INVENTION

According to a first aspect of the present invention there is provided a hollow sphere organic pigment formed by (a) emulsion-polymerizing multistaged polymer particles including (1) a hydrophilic core polymer formed from 5% to 100% by weight, based on the total weight of the core polymer, of a hydrophilic monoethylenically unsaturated monomer and from 0% to 95% by weight, based on the total weight of the core polymer, of at least one nonionic monoethylenically unsaturated monomer;

(2) a first shell polymer formed from 90% to 99.9% by weight, based on the total weight of the first shell polymer, of at least one nonionic monoethylenically unsaturated monomer and from 0.1% to 10% by weight, based on the total weight of the first shell polymer, of an acid-functional monoethylenically unsaturated monomer, wherein the first shell polymer fully encapsulates the core polymer, wherein the ratio of the weight of the core polymer to the weight of the first shell polymer is from 1:2 to 1:100, and wherein the first shell polymer has a glass transition temperature greater than 50° C.; and (3) a second shell polymer formed from 93% to 99.9% by weight, based on the total weight of the second shell polymer, of at least one nonionic monoethylenically unsaturated monomer and from 0.1% to 7% by weight, based on the total weight of the second shell polymer, of an acid functional monoethylenically unsaturated monomer, wherein the second shell polymer is formed in the presence of the first shell polymer, and wherein the second shell polymer has a glass transition temperature from −15° C. to −50° C., and wherein the second shell polymer is at least 15% by weight of the total weight of the first shell polymer and the second shell polymer; and (b) neutralizing the particles formed with a base so as to swell the core and form particles containing a void.

According to a second aspect of the present invention there is provided a waterborne paper or paperboard coating composition including the hollow sphere organic pigment of the first aspect of the present invention.

According to a third aspect of the present invention there is provided a method for improving the strength and opacity of a paper or paperboard coating including applying the coating composition of the second aspect of the present invention to paper or paperboard and drying the coating composition.

According to a fourth aspect of the present invention there is provided a coated paper or paperboard bearing the dried coating composition of the second aspect of the present invention.

According to a fifth aspect of the present invention there is provided a method for improving the strength and opacity of paper or paperboard including incorporating a hollow sphere organic pigment into the formed wet sheet of paper or paperboard, the hollow sphere pigment formed by (a) emulsion-polymerizing multistaged polymer particles including (1) a hydrophilic core polymer formed from 5% to 100% by weight, based on the total weight of the core polymer, of a hydrophilic monoethylenically unsaturated monomer and from 0% to 95% by weight, based on the total weight of the core polymer, of at least one nonionic monoethylenically unsaturated monomer;

(2) a first shell polymer formed from 90% to 99.9% by weight, based on the total weight of the first shell polymer, of at least one nonionic monoethylenically unsaturated monomer and from 0.1% to 10% by weight, based on the total weight of the first shell polymer, of an acid functional monoethylenically unsaturated monomer, wherein the first shell polymer fully encapsulates the core polymer, wherein the ratio of the weight of the core polymer to the weight of the first shell polymer is from 1:2 to 1:100, and wherein the first shell polymer has a glass transition temperature greater than 50° C.; and (3) a second shell polymer formed from 93% to 99.9% by weight, based on the total weight of the second shell polymer, of at least one nonionic monoethylenically unsaturated monomer and from 0.1% to 7% by weight, based on the total weight of the second shell polymer, of an acid functional monoethylenically unsaturated monomer, wherein the second shell polymer is formed in the presence of the first shell polymer, and wherein said second shell polymer has a glass transition temperature lower than 15° C., and wherein the second shell polymer is at least 15% by weight of the total weight of the first shell polymer and the second shell polymer; and (b) neutralizing the particles formed with a base so as to swell the core and form particles containing a void; and drying said sheet.

DETAILED DESCRIPTION

The hollow sphere organic pigment of this invention, when dried, contains a hydrophilic core containing a void, the core being encapsulated by a first shell polymer, the first shell polymer having polymerized thereon a second shell polymer.

The hydrophilic core polymer of the multistaged polymer particles of this invention is the product of emulsion polymerizing from 5% by weight to 100% by weight, based on the total weight of the core polymer, of a hydrophilic monoethylenically unsaturated monomer and from 0% by weight to 95% by weight, based on the total weight of the core polymer, of at least one nonionic monoethylenically unsaturated monomer.

Hydrophilic core polymers containing at least 5% by weight, based on the total weight of the core polymer, of at least one hydrophilic monoethylenically unsaturated monomer have practical swellability for the purposes of the present invention. There may be instances wherein, because of the hydrophobicity of certain comonomers or combinations thereof in conjunction with the hydrophobic/hydrophilic balance of a particular acid monomer, the copolymer may require less than 5% by weight, based on the total weight of the core polymer. Preferably, the level of hydrophilic monomer is from 5% to 100% by weight, based on the total weight of the core polymer; more preferably, from 20% to 60% by weight; and most preferably, from 30% to 50% by weight. The hydrophilic core polymer may be made in a single stage or step of the sequential polymerization or may be made by a plurality of steps in sequence.

The hydrophilic core polymer includes at least one hydrophilic monoethylenically unsaturated monomer which is polymerized alone or with at least one nonionic monoethylenically unsaturated monomer. Included in the term "hydrophilic monoethylenically unsaturated monomer" is a nonpolymeric compound containing at least one carboxylic acid group which absorbed into the core polymer before, during or after the polymerization of the hydrophobic shell polymer as a replacement for the hydrophilic monoethylenically unsaturated monomer in the hydrophilic core polymer, as described in U.S. Pat. No. 4,880,842. In addition, this invention contemplates, and includes in the term "hydrophilic monoethylenically unsaturated monomer," the use of a latent hydrophilic core polymer which contains no hydrophilic monoethylenically unsaturated monomer but which is swellable upon hydrolysis to a hydrophilic core polymer as described in U.S. Pat. No. 5,157,084.

Suitable hydrophilic monoethylenically unsaturated monomers useful for making the core polymer include monoethylenically unsaturated monomers containing acid-functionality such as monomers containing at least one carboxylic acid group including (meth)acrylic acid [by "(meth)acrylic" herein is meant acrylic or methacrylic], (meth)acryloxypropionic acid, itaconic acid, aconitic acid, maleic acid, fumaric acid, crotonic acid, monomethyl maleate, monomethyl fumarate, monomethyl itaconate and the like. Acid precursors such as anhydrides, for example maleic anhydride, are included. Acrylic acid and methacrylic acid are preferred.

Suitable nonpolymeric compounds containing at least one carboxylic acid group include $C_6$–$C_{12}$ aliphatic or aromatic monocarboxylic acids and dicarboxylic acids, such as benzoic acid, m-toluic acid, p-chlorobenzoic acid, o-acetoxybenzoic acid, azelaic acid, sebacic acid, octanoic acid, cyclohexanecarboxylic acid, lauric acid and monobutyl phthalate and the like.

Suitable nonionic monoethylenically unsaturated monomers for making the hydrophilic core polymer include styrene, α-methyl styrene, vinyltoluene, ethylene, vinyl acetate, vinyl chloride, vinylidene chloride, acrylonitrile, (meth)acrylamide, ($C_1$–$C_{20}$) alkyl or ($C_3$–$C_{20}$) alkenyl esters of (meth)acrylic acid, such as methyl (meth)acrylate, ethyl (meth)acrylate, butyl (meth)acrylate, 2-ethylhexyl (meth)acrylate, benzyl (meth)acrylate, lauryl (meth)acrylate, oleyl (meth)acrylate, palmityl (meth)acrylate, stearyl (meth)acrylate and the like.

The hydrophilic core polymer, whether obtained by a single stage process or a process involving several stages, has an average size of 50 to 2000 nanometers, preferably 100 to 1000 nanometers, more preferably 150 to 500 nanometers, diameter in unswollen condition. If the core is obtained from a seed polymer, the seed polymer may have an average particle size of 30 nm to 200 nm.

The hydrophilic core polymer may also optionally contain less than 20% by weight, based on the total weight of the core polymer, preferably 0.1% to 3% by weight, of polyethylenically unsaturated monomer, wherein the amount used is generally approximately directly proportional to the amount of hydrophilic monoethylenically unsaturated monomer used. Alternatively, the hydrophilic core polymer may contain from 0.1% to 60% by weight, based on the total weight of the core polymer, of butadiene.

Suitable polyethylenically unsaturated monomers include alkylene glycol diacrylates and dimethacrylates, such as for example, ethylene glycol diacrylate, ethylene glycol dimethacrylate, 1,3-butylene glycol diacrylate, 1,4-butylene glycol diacrylate propylene glycol diacrylate and triethylene glycol dimethylacrylate; 1,3-glycerol dimethacrylate; 1,1,1-trimethylol propane dimethacrylate; 1,1,1-trimethylol ethane diacrylate; pentaerythritol trimethacrylate; 1,2,6-hexane triacrylate; sorbitol pentamethacrylate; methylene bis-acrylamide, methylene bis-methacrylamide, divinyl benzene, vinyl methacrylate, vinyl crotonate, vinyl acrylate, vinyl acetylene, trivinyl benzene, triallyl cyanurate, divinyl acetyl divinyl ethane, divinyl sulfide, divinyl ether, divinyl sulfone, diallyl cyanamide, ethylene glycol divinyl ether, diallyl phthalate, divinyl dimethyl silane, glycerol trivinyl ether, divinyl adipate; dicyclopentenyl (meth)acrylates; dicyclopentenyloxy (meth)acrylates; unsaturated esters of glycol monodicyclopentenyl ethers; allyl esters of α,β- unsaturated mono- and dicarboxylic acids having terminal ethylenic unsaturation including allyl methacrylate, allyl acrylate, diallyl maleate, diallyl fumarate, diallyl itaconate and the like.

After the hydrophilic core polymer has been formed a tiecoat may be formed on the hydrophilic core. The tiecoat (referred to in some prior patents as "the first stage of sheath formation") may be an acrylic polymer which compatibilizes the hydrophilic core polymer with the one or more hydrophobic shell polymers, particularly for a hydrophilic core polymer having a particle size diameter of less than 280 nanometers (nm).

The first shell polymer is formed from 90% by weight to 99.9% by weight, based on the total weight of shell polymer, of at least one nonionic monoethylenically unsaturated monomer and from 0.1% by weight to 10% by weight, based on the total weight of the shell polymer, of an acid-functional monoethylenically unsaturated monomer. The second shell polymer is formed from 93% by weight to 99.9% by weight, based on the total weight of shell polymer, of at least one nonionic monoethylenically unsaturated monomer and from 0.1% by weight to 7% by weight, based on the total weight of the shell polymer, of an acid-functional monoethylenically unsaturated monomer.

Suitable nonionic monoethylenically unsaturated monomers for making the first or second hydrophobic shell polymer include styrene, a-methyl styrene, vinyltoluene, ethylene, vinyl acetate, vinyl chloride, vinylidene chloride, acrylonitrile, (meth)acrylamide, ($C_1$–$C_{20}$) alkyl or ($C_3$–$C_{20}$) alkenyl esters of (meth)acrylic acid, such as methyl (meth) acrylate, ethyl (meth)acrylate, butyl (meth)acrylate, 2-ethylhexyl (meth)acrylate, benzyl (meth)acrylate, lauryl (meth)acrylate, oleyl (meth)acrylate, palmityl (meth) acrylate, stearyl (meth)acrylate and the like. Styrene is preferred for the first shell polymer.

Suitable monoethylenically unsaturated monomers containing acid-functionality for making the first or second hydrophobic polymer shell include acrylic acid, methacrylic acid, acryloxypropionic acid, (meth)acryloxypropionic acid, itaconic acid, aconitic acid, maleic acid, fumaric acid, crotonic acid, monomethyl maleate, monomethyl fumarate, monomethyl itaconate and the like. Acid precursors such as anhydrides, for example maleic anhydride are included. Acrylic acid and methacrylic acid are preferred.

The first shell polymer fully encapsulates the core polymer. The ratio of the weight of the core polymer to the weight of the first shell polymer is from 1:2 to 1:100. The first shell polymer has a glass transition temperature ("Tg") greater than 50° C. Preferred is a Tg of the first shell polymer of greater than 90° C.

The second shell polymer is formed in the presence of the first shell polymer. There may be other shell polymer compositions or tiecoats formed after the first shell polymer has been formed, but in any event they are formed before the second shell polymer is formed. The second shell polymer has a glass transition temperature from –15° C. to –50° C., and the second shell polymer is at least 20% by weight of the total weight of the first shell polymer and the second shell polymer.

Glass transition temperatures (Tgs) herein are those calculated by the Fox Equation, that is, for calculating the Tg of a copolymer of monomers M1 and M2, $$1/Tg(calc.)=w(M1)/Tg(M1)+w(M2)/Tg(M2),$$

wherein

Tg(calc.) is the glass transition temperature calculated for the copolymer w(M1) is the weight fraction of monomer M1 in the copolymer w(M2) is the weight fraction of monomer M2 in the copolymer Tg(M1) is the glass transition temperature of the homopolymer of M1

Tg(M2) is the glass transition temperature of the homopolymer of M2

All temperatures used in this calculation are expressed in ° K.

The glass transition temperature of homopolymers may be found, for example, in "Polymer Handbook", edited by J. Brandrup and E. H. Immergut, Interscience Publishers.

As used herein, the term "multistaged" or "sequentially" emulsion polymerized" refers to polymers (including homopolymers and copolymers) which are prepared in aqueous medium by an emulsion polymerization process wherein the dispersed polymer particles of a preformed latex or "seed" polymer in the aqueous medium are increased in size by deposition thereon of polymerized product of one or more successive monomer charges introduced into the medium containing dispersed particles of the preformed latex in one or more subsequent stages.

The term "seed" polymer is used herein to refer to an aqueous emulsion polymer dispersion which may be the initially-formed dispersion, that is, the product of a single stage of emulsion polymerization or it may be the emulsion polymer dispersion obtained at the end of any subsequent stage except the final stage of the sequential polymerization. Thus, a hydrophilic core polymer which is herein intended to be fully encapsulated with a shell by at least two subsequent stages of emulsion polymerization may itself be termed a seed polymer for the next stage wherein the shell-forming polymer is deposited on such seed polymer particles.

The first hydrophobic shell polymer may be made in a single stage or step of the sequential polymerization or may be made by a plurality of steps in sequence following the polymerization of hydrophilic core polymer without the need for a tiecoat layer. The first stage of emulsion polymerization in the process of the present invention may be the preparation of a seed polymer containing small dispersed polymer particles insoluble in the aqueous emulsion polymerization medium. This seed polymer may or may not contain any hydrophilic monomer component but provides particles of minute size which form the nuclei on which the hydrophilic core polymer, with or without nonionic comonomer, is formed.

A water-soluble free radical initiator is utilized in the aqueous emulsion polymerization. Suitable water-soluble free radical initiators include hydrogen peroxide; tert-butyl peroxide; alkali metal such as sodium, potassium and lithium persulfate; ammonium persulfate; and mixture of such an initiator with a reducing agent, such as a sulfite, including an alkali metal metabisulfite, hydrosulfite, and hyposulfite; sodium formaldehyde sulfoxylate; and a reducing sugar, to form a redox system. The amount of initiator may be from 0.01% by weight to 2% by weight of the monomer charged and in a redox system, a corresponding range of 0.01% by weight to 2% by weight of reducing agent may be used. The temperature may be in the range of 10° C. to 100° C. In the case of the persulfate systems, the temperature is preferably in the range of 60° C. to 90° C. In the redox system, the temperature is preferably in the range of 30° C. to 70° C., preferably below 60° C., more preferably in the range of 30° C. to 45° C. As a general rule, the amount of emulsifier should be kept below that corresponding to the critical micelle concentration for a particular monomer system, but while this limitation is preferable and produces a unimodal product, it has been found that in some systems the critical micelle concentration of the emulsifier may be exceeded somewhat without the formation of an objectionable or excessive number of dispersed micelles or particles It is for the purpose of controlling the number of micelles during the various stages of polymerization so that the deposition of the subsequently formed polymer in each stage occurs upon the dispersed micelles or particles formed in the previous stages, that the concentration of emulsifier is kept low.

Any nonionic or anionic emulsifier may be used, either alone or together. Examples of suitable nonionic type of emulsifier include tert-octylphenoxyethylpoly(39)-ethoxyethanol, polyethylene glycol 2000 monooleate, ethoxylated castor oil, block copolymers of propylene oxide and ethylene oxide, polyoxyethylene(20) sorbitan monolaurate and nonylphenoxyethyl-poly(40)ethoxyethanol. Examples of suitable anionic emulsifiers include sodium lauryl sulfate, sodium dodecylbenzenesulfonate, sodium lauryl ether sulfate, sodium alpha-olefin (C14–C16) sulfonate, ammonium or alkali metal salts of sulfosuccinate derivatives, ammonium or alkali metal salts of fatty acids such as stearic acid, linseed oil fatty acid, and coconut oil fatty acid, ammonium or alkali metal salts of phosphate esters of ethoxylated nonylphenol and tert-octylphenoxyethoxypoly(39)ethoxyethyl sulfate, sodium salt. The viscosity-average molecular weight of the polymer formed in a given stage may range from 100,000, or lower if a chain transfer agent is used, to several million molecular weight. When 0.1% by weight to 20% by weight, based on the weight of the monomer, of a polyethylenically unsaturated monomer mentioned hereinbefore is used in making the acid polymer, the molecular weight is increased whether or not crosslinking occurs. The use of the polyethylenically unsaturated monomer reduces the tendency of the core polymer to dissolve when the multistaged polymer is treated with a swellant for the core. If it is desired to produce a hydrophilic core polymer having a molecular weight in the lower part of the range, such as from 500,000 down to as low as 20,000, it is frequently most practical to do so by avoiding the polyethylenically unsaturated monomers and using a chain transfer agent instead, such as 0.05% to 2% or more thereof, examples being alkyl mercaptans, such as sec-butyl mercaptan.

The polymerization of the first shell polymer may be performed in the same reaction vessel in which the formation of the core was accomplished or the reaction medium containing the dispersed core particles may be transferred to another reaction container. It is generally unnecessary to add emulsifier unless a polymodal product is desired, but in certain monomer/ emulsifier systems for forming the shell, the tendency to produce gum or coagulum in the reaction medium may be reduced or prevented by the addition of 0.05% to 2.0% by weight, based on total weight of the shell polymer, of emulsifier without detriment to the deposition of the polymer formed on the previously formed core particles.

The amount of polymer deposited to form shell polymers is generally such as to provide an overall size of the multistage polymer particle of 100 to 2500 nanometers, preferably of 200 to 1500 nanometers, in unswollen condition (that is, before any neutralization to raise the pH to 6 or higher) whether the shell polymers are formed in two or more stages. The second shell polymer is at least 15%, preferably at least 20%, by weight of the first shell polymer and the second shell polymer.

Hollow sphere organic pigments are formed by adding to the hydrophilic core polymer fully encapsulated with a hydrophobic shell polymer, a suitable swelling agent to which the hydrophobic shell polymer is permeable.

In a preferred embodiment, voided polymer particles may be formed by swelling the core polymer with a suitable conjugate base and a solvent, when necessary, which permeates through the shell polymers and then drying the swollen multistaged polymer particles.

The monomers used and the relative proportions thereof in any hydrophobic shell polymer formed should be such that it is permeable to an aqueous or gaseous volatile or fixed basic swellant for the hydrophilic core polymer. Monomeric mixtures for making the hydrophobic shell polymers contain from 0.1% by weight to 10% by weight, based on the total weight of the shell polymer, of an acid-functional monoethylenically unsaturated monomer. However, the proportion of acid-finctional monoethylenically unsaturated monomer in any shell polymer should not exceed one-third the proportion thereof in the core polymer. The content of acid-functional monoethylenically unsaturated monomer in the shell polymers may serve several finctions:

(1) stabilizing of the final sequential polymer dispersion;
(2) assuring permeability of the hydrophobic shell polymer to a swellant for the hydrophilic core polymer; and
(3) compatibilizing the hydrophobic first shell polymer with the hydrophilic core polymer so that the core may be fully encapsulated with the first shell. However, higher levels of acid-functional monomer may lead to undesirabe water senstivity in the paper or paperboard coatings.

The hydrophilic core polymer of the multistage polymer particle is swollen when the polymer particles are subjected to a basic swelling agent that permeates the shell to at least partially neutralize (to a pH of at least 6 to 10) the hydrophilic-functionality of the hydrophilic core polymer and thereby to cause swelling by hydration of the hydrophilic core polymer. The expansion may involve partial merging of the outer periphery of the core into the pores of the inner periphery of the shell and also partial enlargment or bulging of the shell and the entire particle overall. When the swelling agent is removed by drying, the shrinkage of the core tends tends to develop a void, the extent of which depends upon the resistance of the shell to restoration to its previous size. By "void" herein is mean a polymer-free space, typically filled with water in the aqueous dispersion and with air in the dried hollow sphere pigment.

In a preferred embodiment unreacted monomer is provided to the multistage emulsion polymer particle along with the swelling agent under conditions such that substantially no polymerization is occurring. There are many means for providing that no substantial polymerization of monomer is occurring including the addition of one or more polymerization inhibitors, the addition of one or more reducing agents, waiting for a sufficient period of time until there is substantially no radical flux, cooling the contents of the reactor to limit the reactivity of the free radicals, and combinations thereof. A preferred means involves the addition of one or more polymerization inhibitors such as, for example, N,N-diethylhydroxylamine, N-nitrosodiphenylamine, 2,4-dinitrophenylhydrazine, p-phenylenediamine, phenathiazine, alloocimene, triethyl phosphite, 4-nitrosophenol, 2-nitrophenol, p-aminophenol, 4-hydroxy-2,2,6,6-tetramethylpiperidinyloxy free radical, hydroquinone, p-methoxyhydroquinone, t-butyl-p-hydroquinone, 2,5-di-t-butyl-p-hydroquinone, 1,4-napththalenediol, 4-t-butyl catechol, copper sulfate, coppoer nitrate, cresol, and phenol. When used, the polymerization inhibitors are used in an amount effective to substantially stop polymerization, generally from 25 to 5,000 parts per million, preferably from 50 to 3500 parts per million based on polymer solids.

Suitable swelling agents for hydrophilic core polymer include volatile bases such as ammonia, ammonium hydroxide, and volatile lower aliphatic amines, such as morpholine, trimethylamine, and triethylamine, and the like; fixed or permanent bases such as potassium hydroxide, lithium hydroxide, zinc ammonium complex, copper ammonium complex, silver ammonium complex, strontium hydroxide, barium hydroxide and the like. Solvents, such as, for example, ethanol, hexanol, octanol, Texanol® solvent and those described in U.S. Pat. No. 4,594,363, may be added to aid in fixed or permanent base penetration.

When the hydrophilic core polymer is fully encapsulated, it does not titrate with alkali metal bases under normal analytical conditions of 1 hour and at room temperature. To demonstrate full encapsulation in the illustrative examples, samples may be removed during the course of the shell polymerization and titrated with sodium hydroxide.

The waterborne coating composition contains hollow sphere pigment and, optionally, binder(s), water, pigment(s) and coatings adjuvants, as are well known in the art. The predominant pigment used in paper and paperboard coatings is typically clay and/or calcium carbonate but other inorganic or organic pigments may be included such as, for example, calcined clay, titanium dioxide, calcium carbonate, and solid polystyrene particles. The coating of this invention, when pigment is used, typically contains from 2% to 25%, based on the dry weight of the pigment in the paper or paperboard coating, of the hollow sphere organic pigment of this invention.

The binder used in paper or paperboard coatings may be a natural or synthetic polymer in the form of a solution or dispersion in water such as, for example, starch, hydroxyethylated starch, protein, polyvinyl acetate, poly(styrene/acrylate) and poly(styrene/butdiene). Binders, when used, are typically used at a total level of 3–20% by dry weight based on the weight of dry pigment.

Coatings adjuvants used in paper or paperboard coatings may optionally include crosslinking agents, lubricants, thickeners, rheology modifiers, buffers, biocides, pigment dispersants, surfactants, and waxes.

The waterborne coating is prepared by techniques which are well known in the paper and paperboard coatings art. For a pigmented coating, the pigment(s) is well-dispersed in a waterborne medium under high shear such as is afforded by a COWLES® mixer. Then the binder(s) is added under low shear stirring along with other coatings adjuvants, as desired. The solids content of the waterborne pigmented coating may be from 40% to 70% by weight. The viscosity of the waterborne pigmented coating composition may be from 1000 centipoise to 5000 centipoise, as measured using a Brookfield viscometer (Model LVT using spindle #3 at 12 rpm); the viscosities appropriate for different application methods vary considerably.

Coated paper or paperboard is paper or paperboard which has a waterborne coating, typically pigmented, applied to one or both sides. The uncoated paper or paperboard substrate typically may have a basis weight of 20–350 g/m.$^2$ and the coating is typically applied in an amount, per side, of 4–30 g./m.$^2$ using conventional coatings methods such as, for example, a trailing blade coater, a size press, and an air knife coater.

In an alternative embodiment the hollow sphere pigment of this invention may be used to provide a coating with equal or lower strength and equal or greater opacity when compared to previously disclosed coatings by incorporating lower than usual amounts of the binder component along with the hollow sphere pigment of this invention.

In another embodiment a method for improving the strength and opacity of paper or paperboard by incorporating a hollow sphere organic pigment into the formed wet, or undried, sheet of paper or is provided. That is, the hollow sphere pigment is incorporated into the sheet in the wet-end during the formation of the sheet or the board from fiber. The particular hollow sphere pigment is formed by a process as disclosed herein-above. In particular, the hollow sphere pigment for wet-end use in paper or paperboard is formed by (a) emulsion-polymerizing multistaged polymer particles including (1) a hydrophilic core polymer formed from 5% to 100% by weight, based on the total weight of the core polymer, of a hydrophilic monoethylenically unsaturated monomer and from 0% to 95% by weight, based on the total weight of the core polymer, of at least one nonionic monoethylenically unsaturated monomer;

(2) a first shell polymer formed from 90% to 99.9% by weight, based on the total weight of the first shell polymer, of at least one nonionic monoethylenically unsaturated monomer and from 0.1% to 10% by weight, based on the total weight of the first shell polymer, of a hydrophilic monoethylenically unsaturated monomer, wherein the first shell polymer fully encapsulates the core polymer, wherein the ratio of the weight of the core polymer to the weight of the first shell polymer is from 1:2 to 1:100, and wherein the first shell polymer has a glass transition temperature greater than 50° C.; and (3) a second shell polymer formed from 93% to 99.9% by weight, based on the total weight of the second shell polymer, of at least one nonionic monoethylenically unsaturated monomer and from 0.1% to 7% by weight, based on the total weight of the second shell polymer, of a hydrophilic monoethylenically unsaturated monomer, wherein the second shell polymer is formed in the presence of said first shell polymer, and wherein said second shell polymer has a glass transition temperature lower than 15° C. and wherein the second shell polymer is at least 15% by weight of the total weight of the first shell polymer and the second shell polymer; and neutralizing the particles formed with a base so as to swell the core and form particles containing a void.

Previous attempts to strengthen and opacity paper and paperboard sheets using two stage polymers having a relatively soft shell polymer composition such as, for example, disclosed in U.S. Pat. No. 4,806,207, provided some strengthening but improvements in opacity were needed. In one embodiment of the method of this invention a hollow sphere pigment as described herein is added as a wet end additive. Generally, a predominantly cellulosic fiber pulp slurry is provided, the hollow sphere pigment is added and mixed, the modified slurry is formed into a wet sheet which contains hollow sphere pigment on a paper machine by techniques well known in the art, and the sheet is dried. In a second embodiment of the method of this invention a hollow sphere pigment as described herein is added to a dried, partially dried, or wet sheet of paper or paperboard on or off of a paper machine by well known techniques such as a size press or in a saturation bath, and the sheet containing hollow sphere pigment is dried.

EXPERIMENTAL METHODS
Measurement of Particle Size

Particle sizes of the emulsion polymer was measured using either the BI-90 or CHDF instruments. Particle sizes may be determined using a Brookhaven BI-90 Particle Sizer which employs a light scattering technique. CHDF measurements of particle diameter were performed using a Matec Applied Sciences CHDF 1100 instrument using samples at 0.5 to 5.0% solids content.

EXAMPLES

Comparative Example A
Preparation of Core Polymer Dispersion

A 5-liter, four-necked round bottom flask was equipped with a paddle stirrer, thermometer, nitrogen inlet and reflux condenser. Deionized water, 2890 grams, was added to the kettle and heated to 85° C. under a nitrogen atmosphere. A monomer emulsion consisting of 569.5 grams of deionized water, 7.2 grams of sodium lauryl ethersulfate surfactant (30%), 619.7 grams of methyl methacrylate, and 7.4 grams of methacrylic acid was prepared. A portion of the monomer emulsion, 139.4 grams, was added to the heated flask, and 23.1 grams of sodium lauryl ethersulfate surfactant (30%) and 409.7 grams of methacrylic acid were added to the remainder of the monomer emulsion. A solution of sodium persulfate, 4.7 grams, in 25.5 grams deionized water were added to the heated flask and after a slight exotherm the monomer emulsion was gradually added over approximately a 2 hour period while the temperature was maintained at 85° C. After completion of the monomer emulsion feed the polymer dispersion was held at 85° C. for 30 minutes, then cooled to room temperature and filtered to remove any coagulum formed. The resulting dispersion had a solids content of 23% and a particle diameter of 210 nm.

Comparative Example B
Preparation of Multistaged Polymer Particles

A 5-liter, four-necked round bottom flask was equipped with a paddle stirrer, thermometer, nitrogen inlet and reflux condenser. Deionized water, 1435 grams, was added to the kettle and heated to 85° C. under a nitrogen atmosphere. A solution of 2 grams of ammonium persulfate in 40 grams of deionized water, 312 grams of core latex prepared as in Comparative Example A, and 40 grams deionized water were added to the heated flask. A first monomer emulsion consisting of 416 grams deionized water, 9.9 grams of sodium dodecylbenzene sulfonate (23%), and 961.6 grams of styrene was prepared. Gradual addition of this first monomer emulsion was begun as well as gradual addition of a solution of 3.5 grams of ammonium persulfate in 150 grams of deionized water. A solution of 30 grams of acrylic acid in 120 grams deionized water was added over 10 minutes with the reaction temperature maintained at 80° C. The addition of the first monomer emulsion was continued for an additional 80 minutes with the reaction temperature maintained at 90° C. until 120 grams of the first monomer emulsion remained which was reserved. A second monomer emulsion consisting of 156 grams of deionized water, 3.7 grams of sodium dodecylbenzene sulfonate (23%), 144.2 grams of butyl acrylate, 198.3 grams of styrene, and 18 grams of methacrylic acid was then added over 45 minutes. A solution of 0.6 grams of ammonium persulfate in 40 grams deionized water was added followed by a polymerization inhibitor. The reserved first monomer emulsion was added and the reaction mixture was maintained at 85° C. A solution of 42 grams of aqueous ammonia (28%) and 2 grams of surfactant in 80 grams deionized water was added. After 10 minutes a solution of 0.01 gram ferrous sulfate heptahydrate and 0.01 gram of Versene in 11 grams of water was added followed by a solution of 4.25 grams tert-butylhydroperoxide (70%) in 60 grams deionized water. Next a solution of 2.6 grams of isoascorbic acid in 60 grams deionized water was added gradually over 15 minutes. The reaction mixture was cooled and filtered to remove any coagulum formed. The final latex product had a solids content of 31.9% and a particle diameter of 586 nm.

Comparative Example C
Preparation of Multistaged Polymer Particles

A 5-liter, four-necked round bottom flask was equipped with a paddle stirrer, thermometer, nitrogen inlet and reflux condenser. Deionized water, 1435 grams, was added to the kettle and heated to 85° C. under a nitrogen atmosphere. A solution of 2 grams of ammonium persulfate in 20 grams of deionized water, 312 grams of core latex prepared as in Comparative Example A, and 40 grams deionized water were added to the heated flask. A first monomer emulsion consisting of 416 grams deionized water, 9.9 grams of sodium dodecylbenzene sulfonate (23%), and 961.6 grams of styrene was prepared. Gradual addition of this first monomer emulsion was begun as well as gradual addition of a solution of 3.5 grams of ammonium persulfate in 150 grams of deionized water. A solution of 30 grams of acrylic acid in 120 grams deionized water was added over 10 minutes with the reaction temperature maintained at 80° C. The addition of the first monomer emulsion was continued for an additional 75 minutes with the reaction temperature maintained at 90° C. until 120 grams of the first monomer emulsion remained which was reserved. A second monomer emulsion consisting of 156 grams of deionized water, 3.7 grams of sodium dodecylbenzene sulfonate (23%), 180.3 grams of butyl acrylate, 162.3 grams of styrene, and 18 grams of methacrylic acid was then added over 40 minutes. A solution of 0.6 grams of ammonium persulfate in 40 grams deionized water was added followed by a polymerization inhibitor. The reserved first monomer emulsion was added and the reaction mixture was maintained at 85° C. A solution of 42 grams of aqueous ammonia (28%) and 2 grams of surfactant in 80 grams deionized water was added. After 10 minutes a solution of 0.01 gram ferrous sulfate heptahydrate and 0.01 gram of Versene in 11 grams of water was added followed by a solution of 4.25 grams tert-butylhydroperoxide (70%) in 60 grams deionized water. Next a solution of 2.6 grams of isoascorbic acid in 60 grams deionized water was added gradually over 15 minutes. The reaction mixture was cooled and filtered to remove any coagulum formed. The final latex product had a solids content of 31.4% and a particle diameter of 610 nm.

Example 1
Preparation of Multistaged Polymer Particles

A 5-liter, four-necked round bottom flask was equipped with a paddle stirrer, thermometer, nitrogen inlet and reflux condenser. Deionized water, 1435 grams, was added to the kettle and heated to 85° C. under a nitrogen atmosphere. A solution of 2 grams of ammonium persulfate in 20 grams of deionized water, 312 grams of core latex prepared as in Comparative Example A, and 40 grams deionized water were added to the heated flask. A first monomer emulsion consisting of 416 grams deionized water, 9.9 grams of sodium dodecylbenzene sulfonate (23%), and 961.6 grams of styrene was prepared. Gradual addition of this first monomer emulsion was begun as well as gradual addition of a solution of 3.5 grams of ammonium persulfate in 150 grams of deionized water. A solution of 30 grams of acrylic acid in 120 grams deionized water was added over 10 minutes with the reaction temperature maintained at 80° C. The addition of the first monomer emulsion was continued for an additional 75 minutes with the reaction temperature maintained at 90° C. until 120 grams of the first monomer emulsion remained which was reserved. A second monomer emulsion consisting of 156 grams of deionized water, 3.7 grams of sodium dodecylbenzene sulfonate (23%), 288.5 grams of butyl acrylate, 54.1 grams of styrene, and 18 grams of methacrylic acid was then added over 40 minutes. A solution of 0.6 grams of ammonium persulfate in 40 grams deionized water was added followed a polymerization inhibitor. The reserved first monomer emulsion was added and the reaction mixture was maintained at 85° C. A solution of 42 grams of aqueous ammonia (28%) and 2 grams of surfactant in 80 grams deionized water was added. After 10 minutes a solution of 0.01 gram ferrous sulfate heptahydrate and 0.01 gram of Versene in 11 grams of water was added followed by a solution of 4.25 grams tert-butylhydroperoxide (70%) in 60 grams deionized water. Next a solution of 2.6 grams of isoascorbic acid in 60 grams deionized water was added gradually over 15 minutes. The reaction mixture was cooled and filtered to remove any coagulum formed. The final latex product had a solids content of 31.7% and a particle diameter of 622 nm.

Example 2
Preparation of Multistaged Polymer Particles

A 5-liter, four-necked round bottom flask was equipped with a paddle stirrer, thermometer, nitrogen inlet and reflux condenser. Deionized water, 1435 grams, was added to the kettle and heated to 85° C. under a nitrogen atmosphere. A solution of 2 grams of ammonium persulfate in 40 grams of deionized water, 312 grams of core latex prepared as in Comparative Example A, and 40 grams deionized water were added to the heated flask. A first monomer emulsion consisting of 416 grams deionized water, 9.9 grams of sodium dodecylbenzene sulfonate (23%), and 961.6 grams of styrene was prepared. Gradual addition of this first monomer emulsion was begun as well as gradual addition of a solution of 3.5 grams of ammonium persulfate in 150 grams of deionized water. A solution of 30 grams of acrylic acid in 120 grams deionized water was added over 10 minutes with the reaction temperature maintained at 80° C. The addition of the first monomer emulsion was continued for an additional 80 minutes with the reaction temperature maintained at 90° C. until 120 grams of the first monomer emulsion remained which was reserved. A second monomer emulsion consisting of 156 grams of deionized water, 3.7 grams of sodium dodecylbenzene sulfonate (23%), 288.5 grams of butyl acrylate and 72.1 grams of styrene was then added over 40 minutes. A solution of 0.6 grams of ammonium persulfate in 40 grams deionized water was added followed by a polymerization inhibitor. The reserved first monomer emulsion was added and the reaction mixture was maintained at 85° C. A solution of 29 grams of aqueous ammonia (28%) and 2 grams surfactant in 80 grams deionized water was added. After 10 minutes a solution of 0.01 gram ferrous sulfate heptahydrate and 0.01 gram of Versene in 11 grams of water was added followed by a solution of 4.25 grams tert-butylhydroperoxide (70%) in 60 grams deionized water. Next a solution of 2.6 grams of isoascorbic acid in 60 grams deionized water was added gradually over 15 minutes. The reaction mixture was cooled and filtered to remove any coagulum formed. The final latex product had a solids content of 30.4% and a particle diameter of 607 nm.

Example 3
Preparation of Multistaged Polymer Particles

A 5-liter, four-necked round bottom flask was equipped with a paddle stirrer, thermometer, nitrogen inlet and reflux condenser. Deionized water, 1435 grams, was added to the kettle and heated to 85° C. under a nitrogen atmosphere. A solution of 2 grams of ammonium persulfate in 20 grams of deionized water, 312 grams of core latex prepared as in Comparative Example A, and 40 grams deionized water were added to the heated flask. A first monomer emulsion consisting of 416 grams deionized water, 9.9 grams of sodium dodecylbenzene sulfonate (23%), and 961.6 grams of styrene was prepared. Gradual addition of this first monomer emulsion was begun as well as gradual addition of a solution of 3.5 grams of ammonium persulfate in 150 grams of deionized water. A solution of 30 grams of acrylic acid in 120 grams deionized water was added over 10 minutes with the reaction temperature maintained at 80° C. The addition of the first monomer emulsion was continued for an additional 70 minutes with the reaction temperature maintained at 90° C. until 120 grams of the first monomer emulsion remained which was reserved. A second monomer emulsion consisting of 156 grams of deionized water, 3.7 grams of sodium dodecylbenzene sulfonate (23%), 288.5 grams of butyl acrylate, 53.4 grams of styrene, 0.7 grams allyl methacrylate, and 18 grams of methacrylic acid was then added over 45 minutes. A solution of 0.6 grams of ammonium persulfate in 40 grams deionized water was added followed by a polymerization inhibitor. The reserved first monomer emulsion was added and the reaction mixture was maintained at 85° C. A solution of 42 grams of aqueous ammonia (28%) and 2 grams of surfactant in 80 grams deionized water was added. After 10 minutes a solution of 0.01 gram ferrous sulfate heptahydrate and 0.01 gram of Versene in 11 grams of water was added followed by a solution of 4.25 grams tert-butylhydroperoxide (70%) in 60 grams deionized water. Next a solution of 2.6 grams of isoascorbic acid in 60 grams deionized water was added gradually over 15 minutes. The reaction mixture was cooled and filtered to remove any coagulum formed. The final latex product had a solids content of 31.7% and a particle diameter of 598 nm.

Example 4
Preparation of Multistaged Polymer Particles

A 5-liter, four-necked round bottom flask was equipped with a paddle stirrer, thermometer, nitrogen inlet and reflux condenser. Deionized water, 1435 grams, was added to the kettle and heated to 85° C. under a nitrogen atmosphere. A solution of 2 grams of ammonium persulfate in 20 grams of deionized water, 312 grams of core latex prepared as in Example 0, and 40 grams deionized water were added to the heated flask. A first monomer emulsion consisting of 416 grams deinonized water, 9.9 grams of sodium dodecylbenzene sulfonate (23%), and 961.6 grams of styrene was prepared. Gradual addition of this first monomer emulsion was begun as well as gradual addition of a solution of 3.5 grams of ammonium persulfate in 150 grams of deionized water. A solution of 30 grams of acrylic acid in 120 grams deionized water was added over 10 minutes with the reaction temperature maintained at 80° C. The addition of the first monomer emulsion was continued for an additional 70 minutes with the reaction temperature maintained at 90° C. until 120 grams of the first monomer emulsion remained which was reserved. A second monomer emulsion consisting of 156 grams of deionized water, 3.7 grams of sodium dodecylbenzene sulfonate (23%), 324.5 grams of butyl acrylate, 18 grams of styrene, and 18 grams of methacrylic acid was then added over 45 minutes. A solution of 0.6 grams of ammonium persulfate in 40 grams deionized water was added followed by a polymerization inhibitor. The reserved first monomer emulsion was added and the reaction mixture was maintained at 85° C. A solution of 42 grams of aqueous ammonia (28%) and 2 grams of surfactant in 80 grams deionized water was added. After 10 minutes a solution of 0.01 gram ferrous sulfate heptahydrate and 0.01 gram of Versene in 11 grams of water was added followed by a solution of 4.25 grams tert-butylhydroperoxide (70%) in 60 grams deionized water. Next a solution of 2.6 grams of isoascorbic acid in 60 grams deionized water was added gradually over 15 minutes. The reaction mixture was cooled and filtered to remove any coagulum formed. The final latex product had a solids content of 31.8% and a particle diameter of 594 nm.

Comparative Example D
Preparation of Multistaged Polymer Particles

A 5-liter, four-necked round bottom flask was equipped with a paddle stirrer, thermometer, nitrogen inlet and reflux condenser. Deionized water, 1435 grams, was added to the kettle and heated to 85° C. under a nitrogen atmosphere. A solution of 2 grams of ammonium persulfate in 40 grams of deionized water, 312 grams of core latex prepared as in Example 0, and 40 grams deionized water were added to the heated flask. A first monomer emulsion consisting of 416 grams deionized water, 9.9 grams of sodium dodecylbenzene sulfonate (23%), and 961.6 grams of styrene was prepared. Gradual addition of this first monomer emulsion was begun as well as gradual addition of a solution of 3.5 grams of ammonium persulfate in 150 grams of deionized water. A solution of 30 grams of acrylic acid in 120 grams deionized water was added over 10 minutes with the reaction temperature maintained at 80° C. The addition of the first monomer emulsion was continued for an additional 75 minutes with the reaction temperature maintained at 90° C. until 120 grams of the first monomer emulsion remained which was reserved. A second monomer emulsion consisting of 156 grams of deionized water, 3.7 grams of sodium dodecylbenzene sulfonate (23%), and 360.6 grams of butyl acrylate was then added over 45 minutes. A solution of 0.6 grams of ammonium persulfate in 40 grams deionized water was added followed by a polymerization inhibitor. The reserved first monomer emulsion was added and the reaction mixture was maintained at 85° C. A solution of 29 grams of aqueous ammonia (28%) and 2 grams of surfactant in 80 grams deionized water was added. After 10 minutes a solution of 0.01 gram ferrous sulfate heptahydrate and 0.01 gram of Versene in 11 grams of water was added followed by a solution of 4.25 grams tert-butylhydroperoxide (70%) in 60 grams deionized water. Next a solution of 2.6 grams of isoascorbic acid in 60 grams deionized water was added gradually over 15 minutes. The reaction mixture was cooled and filtered to remove any coagulum formed. The final latex product had a solids content of 31.9% and a particle diameter of 593 nm.

Comparative Example E
Preparation of Multistaged Polymer Particles

A 5-liter, four-necked round bottom flask was equipped with a paddle stirrer, thermometer, nitrogen inlet and reflux condenser. Deionized water, 1435 grams, was added to the kettle and heated to 85° C. under a nitrogen atmosphere. A solution of 2 grams of ammonium persulfate in 20 grams of deionized water, 312 grams of core latex prepared as in Example 0, and 40 grams deionized water were added to the heated flask. A first monomer emulsion consisting of 416 grams deionized water, 9.9 grams of sodium dodecylbenzene sulfonate (23%), and 961.6 grams of styrene was prepared. Gradual addition of this first monomer emulsion was begun as well as gradual addition of a solution of 2.4 grams of ammonium persulfate in 150 grams of deionized water. A solution of 30 grams of acrylic acid in 120 grams deionized water was added over 10 minutes with the reaction temperature maintained at 80° C. The addition of the first monomer emulsion was continued for an additional 70 minutes with the reaction temperature maintained at 90° C. until 120 grams of the first monomer emulsion remained which was reserved. A second monomer emulsion consisting of 53 grams of deionized water, 1.3 grams of sodium dodecylbenzene sulfonate (23%), 98.1 grams of butyl acrylate, 18.4 grams of styrene, and 6.1 grams of methacrylic acid was then added over 25 minutes. A solution of 0.6 grams of ammonium persulfate in 40 grams deionized water was added followed by a polymerization inhibitor. The reserved first monomer emulsion was added and the reaction mixture was maintained at 85° C. A solution of 33.5 grams of aqueous ammonia (28%) and 2 grams of surfactant in 80 grams deionized water was added. After 10 minutes a solution of 0.01 gram ferrous sulfate heptahydrate and 0.01 gram of Versene in 11 grams of water was added followed by a solution of 4.25 grams tert-butylhydroperoxide (70%) in 60 grams deionized water. Next a solution of 2.6 grams of isoascorbic acid in 60 grams deionized water was added gradually over 15 minutes. The reaction mixture was cooled and filtered to remove any coagulum formed. The final latex product had a solids content of 29.5% and a particle diameter of 632 nm.

Example 5
Preparation of Multistaged Polymer Particles

A 5-liter, four-necked round bottom flask was equipped with a paddle stirrer, thermometer, nitrogen inlet and reflux condenser. Deionized water, 1575 grams, was added to the kettle and heated to 85° C. under a nitrogen atmosphere. A solution of 1.8 grams of ammonium persulfate in 18 grams of deionized water, 281 grams of core latex prepared as in Example 0, and 36 grams deionized water were added to the heated flask. A first monomer emulsion consisting of 374 grams deionized water, 8.9 grams of sodium dodecylbenzene sulfonate (23%), and 865.4 grams of styrene was prepared. Gradual addition of this first monomer emulsion was begun as well as gradual addition of a solution of 3.9 grams of ammonium persulfate in 135 grams of deionized water. A solution of 27 grams of acrylic acid in 108 grams deionized water was added over 10 minutes with the reaction temperature maintained at 80° C. The addition of the first monomer emulsion was continued for an additional 75 minutes with the reaction temperature maintained at 90° C. until 108 grams of the first monomer emulsion remained which was reserved. A second monomer emulsion consisting of 211 grams of deionized water, 5.0 grams of sodium dodecylbenzene sulfonate (23%), 389.5 grams of butyl acrylate, 73.1 grams of styrene, and 24.3 grams of methacrylic acid was then added over 60 minutes. A solution of 0.5 grams of ammonium persulfate in 36 grams deionized water was added followed by a polymerization inhibitor. The reserved first monomer emulsion was added and the reaction mixture was maintained at 85° C. A solution of 44.1 grams of aqueous ammonia (28%) and 1.8 grams of surfactant in 72 grams deionized water was added. After 10 minutes a solution of 0.009 gram ferrous sulfate heptahydrate and 0.009 gram of Versene in 11 grams of water was added followed by a solution of 3.83 grams tert-butylhydroperoxide (70%) in 54 grams deionized water. Next a solution of 2.34 grams of isoascorbic acid in 54 grams deionized water was added gradually over 15 minutes. The reaction mixture was cooled and filtered to remove any coagulum formed. The final latex product had a solids content of 31.2% and a particle diameter of 634 nm.

Example 6
Preparation of Paper Coated with Waterborne Coating Composition

A pigment slurry was prepared by dispersing 2560 grams HYDRAFINE #1 clay, 640 grams HYDROCARB 90, 3.2 grams Calgon RS-1 (dispersant) and 1241.3 grams water with a Cowles dissolver for 20 minutes (solids=72%). The slurry was used in the preparation of a waterborne coating composition by stirring the ingredients of in Table 6.1. The composition was adjusted to pH to 9.3–9.4 with concentrated ammonia, added dropwise. (Note: HYDROCARB 90 is a product of OMYA Corp.; Calgon RS-1 is a product of Calgon Corp., a subsidiary of ECC Inc.; FINNFIX® ias a trademark of Metsa-Serla, Inc.))

Table 6.1 Ingredients in water borne coating composition
- 256.9 grams Pigment slurry (72%)
- 25.0 grams FINNFIX® 5 (8% TS) carbomethoxycellulose
- 35.8 grams Dow 620 (50.3% TS) binder
- 47.3 grams Multistage Polymer Particle
- 19.5 grams water

TABLE 6.2

Summary of Physical Properties of Multistaged Polymer Particles
Multistage Polymers: 1 Core//13.8(97 Sty/3AA)//x second shell polymer

| Polymer of | BI-90 PS (nm) | % TS | x | Binder Stage Composition (wt.) | Binder Stage Calc Fox Tg ° C. |
|---|---|---|---|---|---|
| Comp.Ex.B | 586 | 31.9 | 5 | 40 BA/55 Sty/5MAA | 20.3 |
| Comp.Ex.C | 610 | 31.4 | 5 | 50 BA/45 Sty/5MAA | 4.9 |
| Example 1 | 622 | 31.7 | 5 | 80 BA/15 Sty/5MAA | −32.9 |
| Example 2 | 607 | 30.4 | 5 | 80 BA/20 Sty | −34.3 |
| Example 3 | 598 | 31.7 | 5 | 80 BA/14.8 Sty/0.2 ALMA/5MAA | −32.9 |
| Example 4 | 594 | 31.8 | 5 | 90 BA/5 Sty/5MAA | −43.3 |
| Comp.Ex.D | 593 | 31.9 | 5 | 100 BA | −54.0 |
| Comp.Ex.E | 632 | 29.5 | 1.7 | 80 BA/15 Sty/5MAA | −32.9 |
| Example 5 | 634 | 31.2 | 7.5 | 80 BA/15 Sty/5MAA | −32.9 |

The water borne coating compositions were drawndown on a 77 g/sq. m.(52 lb/3300 sq ft) wood free sheet, using a #6 wire wound rod, the sheet placed on a manila folder to prevent the sheet being imprinted by the oven rack, and placed in an 81° C. lab convection oven for 60 seconds. Coated sheets were then calendered at 54.4° C./227.5 kN/m/ 201 m/min (130 F/1300 PLI/600 FPM.).

Example 7
Evaluation of Paper Coated with Waterborne Coating

Composition containing multistage polymer particles having various second shell polymer Tgs.

Coated paper prepared according to Example 6 was evaluated; results are found in Table 7.1. Test Method References are: gloss TAPPI T 480 om-92; brightness TAPPI T 452 om-92; smoothness Parker Print Surf-5; opacity TAPPI T 425 om-91; strength (IGT Pick reported in cm/sec carried out according to TAPPI T 514 cm-92 (for paperboard)using tack graded inks; used for coated paper with #18 black ink, B spring, 50 kgf printing pressure.

Parker Print Surf Roughness Tester, Model M590, was manufactured by Messmer Buchel and run in the roughness mode (as opposed to air permeance) with a soft backing used at a clamping pressure of 500 (denoted as PPS-5) in order to measure the roughness of a printing substrate under simulated printing conditions by measuring air leakage between the printing medium and a flat surface pressed against it under specified operating conditions.

TABLE 7.1

| | GLOSS | | | | | IGT |
|---|---|---|---|---|---|---|
| Polymer of | Un | Sheet | PPS-5 | Bright | Opacity | Pick Resist. |
| Comp. Ex. B | 32.5 | 66.7 | 2.08 | 82.9 | 92.4 | 101 ± 5 |
| Comp. Ex. C | 32.0 | 67.4 | 2.10 | 82.8 | 92.5 | 97 ± 9 |
| Example 1 | 30.7 | 66.2 | 2.04 | 82.6 | 92.4 | 154 ± 9 |
| Example 4 | 30.1 | 65.7 | 2.17 | 82.7 | 92.4 | 150 ± 12 |
| Comp. Ex. D | 29.4 | 66.4 | 2.15 | 82.6 | 92.6 | 121 ± 9 |

NOTE: Coating weight was 9.7 +/− 0.2 lbs/3300 sq ft.;
"Un" signifies uncalendered;
"Sheet" signifies clandered under the conditions of Example 6.

Examples 1 and 4 of this invention exhibit drastically improved coating strength as indicated by IGT Pick Resistance at equivalent gloss, smoothness (PPS-5), brightness, and opacity properties when contrasted to the results for Comparative Examples B–D.

Example 8
Evaluation of Paper Coated with Waterborne Coating
Composition containing multistage polymer particles having various amounts of second stage polymer Coated paper prepared according to Example 6 was evaluated as in Example 7; results are found in Table 8.1

TABLE 8.1

| | Properties of coated sheets. | | | | | |
|---|---|---|---|---|---|---|
| | GLOSS | | | | | IGT |
| Polymer of | Un | Sheet | PPS-5 | Bright | Opacity | Pick Resist. |
| Comp. Ex. E | 30.4 | 66.0 | 2.09 | 82.9 | 92.7 | 107 ± 9 |
| Example 1 | 30.7 | 66.2 | 2.04 | 82.6 | 92.4 | 154 ± 9 |
| Example 5 | 29.2 | 65.0 | 2.25 | 82.5 | 92.7 | 152 ± 11 |

NOTE: Coating weight was 9.7 +/− 0.2 lbs/3300 sq ft.;
other notes as in Table 7.1.
Examples 1 and 5 of this invention exhibit drastically improved coating strength as indicated by IGT Pick Resistance at equivalent gloss, smoothness (PPS-5), brightness, and opacity properties when contrasted to the results for Comparative Example E.

Example 9
Evaluation of Paper Coated with Waterborne Coating
Composition containing multistage polymer particles having various second stage polymer compositions Coated paper prepared according to Example 6 was evaluated as in Example 7; results are found in Table 9.1

TABLE 9.1

Properties of coated sheets.

| Polymer of | GLOSS | | | | | IGT |
| --- | --- | --- | --- | --- | --- | --- |
| | Un | Sheet | PPS-5 | Bright | Opacity | Pick Resist. |
| Example 1 | 31.0 | 70.7 | 1.77 | 82.3 | 93.1 | 145 ± 6 |
| Example 2 | 32.0 | 71.5 | 1.80 | 82.0 | 92.8 | 120 ± 11 |
| Example 3 | 32.2 | 71.1 | 1.87 | 82.4 | 92.8 | 133 ± 8 |

NOTE: Coating weight was 9.5 +/− 0 lbs/3300 sq ft.
Examples 1–3 of this invention exhibit characteristic improved coating strength as indicated by IGT Pick Resistance with useful gloss, smoothness (PPS-5), brightness, and opacity properties.

Example 10
Evaluation of Waterborne Coating Composition containing multistage polymer particles having first shell polymer having a Tg<50° C.

A multistaged polymer particle, identified as the polymer of Comparative Example F, having the composition: 1 part core—10 EA/60 MMA/30 MAA/0.5 butylene glycol dimethacrylate; 10 parts first sheath—52 BA/46.7 MMA/1.3 MAA (Tg=0.6° C.); and 10 parts second sheath—52 BA/46 Sty/2 MAA (Tg=0.9° C.) was prepared according to the procedure of Example 9 of U.S. Pat. No. 4,468,498. The multistage polymer (Comp. Ex. F) before and after swelling with ammonia was compared to Example 1 in the following manner. The polymer of Comp. Ex.F (pre- and post-swelling), and the polymer of Example 1 were each blended 50/50 (on a solids basis) with the commercial latex binder Rhoplex® AC-264. The mixtures were drawn down on black vinyl (7 mil wet film using Dow bar applicator). The films were dried overnight. The film containing the polymer of Example 1 was opaque (white) while the films containing the polymer of Comp. Ex. F were clear. The film light reflectance was measured with 0/45 Y-reflectometer allowing the scattering coefficient (S/mil) to be calculated.

TABLE 10.1

Evaluation of dried waterborne coating compositions

| Film with the polymer of | S/mil | Film Appearance |
| --- | --- | --- |
| Comp. Ex. F (pre-neutralization) | 0.004 | clear |
| Comp. Ex. F (post-neutralization) | 0.004 | clear |
| Example 1 | 2.1 | opaque (white) |

The comparative film (from Example 9 of U.S. Pat. No. 4,468,498 having a first shell Tg<50° C. does not maintain voids on film drying and is clear while the multistaged polymer particle of Example 1 of this invention provides the desired opacity.

Example 11
Size Press
A size press simulation of incorporating a hollow sphere pigment into paper was carried out by saturating a 77 g/sq m (52 lb/3300 sq ft) sheet in a bath containing 8% solids by weight or 12% solids by weight of the hollow sphere pigment of Example 1. The add-on was 5.18 and 6.66 g/sq m/side, respectively (3.5 and 4.5 lb/3300sq ft/side). Tensile strengths were determined for the unsaturated sheet and the 5.18 and 6.66 g/sq m/side dried saturated sheets under the following conditions: machine direction, 2.54 cm (1 in) sample width, 5.08 cm (2 in) gap, head separation rate of 30.5 cm/min (12 in/min). They were 11.0 kg, 11.7 kg, and 13.0 kg, respectively, thereby indicating the strengthening of the sheet.

Example 12
Wet-end incorporation of multistaged latex particle into paper and evaluation of paper A multistaged emulsion polymer particle of the following composition was prepared: 1 part core (61.5 methyl methacrylate/38.5 methacrylic acid)/4 parts tie coat (20 butyl methacrylate/77 methyl methacrylate/3 methacrylic acid)/18 parts first shell (polystyrene; Tg=105° C.)/6 parts second shell (55 butyl acrylate/43.7styrene/1.3 methacrylic acid; Tg=−3.6° C).

A 59.2 g/sq m (40 lb/3300 sq ft) paper sheet was formed on a pilot paper machine using a 60/40 softwood/hardwood pulp furnish beaten to 450 CSF (Canadian Standard Freeness). The formed sheets were evaluated as in Example 7 and the tensile strength determined, reporting the average of the machine direction and cross direction tensile strengths.

TABLE 12.1

Evaluation of paper

| Additive/Level (%) | Opacity | Brightness | Tensile Strength |
| --- | --- | --- | --- |
| None | 73 | 85 | 2700 |
| TiO2/5.5 | 84 | 88.5 | 2400 |
| Ex. 12/4.4 | 79 | 89.4 | 2960 |

The multistaged polymer of Example 12 of this invention provided improved brightness, opacity, and strength relative to sheet formed with no additive and improved brightness and strength relative to Titanium dioxide.

What is claimed is:
1. A hollow sphere organic pigment formed by
(a) forming emulsion-polymerized multistaged polymer particles comprising
(1) a hydrophilic core polymer formed from 5% to 100% by weight, based on the total weight of said core polymer, of a hydrophilic monoethylenically unsaturated monomer and from 0% to 95% by weight, based on the total weight of said core polymer, of at least one nonionic monoethylenically unsaturated monomer;
(2) a first shell polymer formed from 90% to 99.9% by weight, based on the total weight of said first shell polymer, of at least one nonionic monoethylenically unsaturated monomer and from 0.1% to 10% by weight, based on the total weight of said first shell polymer, of an acid functional monoethylenically unsaturated monomer, wherein said first shell polymer fully encapsulates said core polymer, wherein the ratio of the weight of said core polymer to the weight of said first shell polymer is from 1:2 to 1:100, and wherein said first shell polymer has a glass transition temperature greater than 50° C.; and
(3) a second shell polymer formed from 93% to 99.9% by weight, based on the total weight of said second shell polymer, of at least one nonionic monoethylenically unsaturated monomer and from 0.1% to 7% by weight, based on the total weight of said second shell polymer, of an acid functional monoethylenically unsaturated monomer, wherein said second shell polymer is formed in the presence of said first shell polymer, and wherein said second shell poly- mer has a glass transition temperature from −15° C. to −50° C., and wherein said second shell polymer is at least 15% by weight of the total weight of said first shell polymer and said second shell polymer; and (b) neutralizing said particles formed with a base so as to swell said core and form particles containing a void.

2. A waterborne paper or paperboard coating composition comprising the hollow sphere organic pigment of claim 1.

3. The coating composition of claim 2 which further comprises at least one pigment and from 2% to 25% by weight, based on the weight of pigment, of said hollow sphere organic pigment.

4. A method for improving the strength and opacity of a paper or paperboard coating comprising applying the coating composition of claim 2 or claim 3 to paper or paperboard and drying said coating composition.

5. A coated paper or paperboard bearing the dried coating composition of claim 2 or claim 3.

6. The coated paper or paperboard of claim 5 wherein said coating is applied by a size press.

7. A method for improving the strength and opacity of paper or paperboard comprising incorporating a hollow sphere organic pigment into the formed wet sheet of paper or paperboard, the hollow sphere pigment formed by (a) emulsion-polymerizing multistaged polymer particles comprising (1) a hydrophilic core polymer formed from 5% to 100% by weight, based on the total weight of said core polymer, of a hydrophilic monoethylenically unsaturated monomer and from 0% to 95% by weight, based on the total weight of said core polymer, of at least one nonionic monoethylenically unsaturated monomer;

(2) a first shell polymer formed from 90% to 99.9% by weight, based on the total weight of said first shell polymer, of at least one nonionic monoethylenically unsaturated monomer and from 0.1% to 10% by weight, based on the total weight of said first shell polymer, of an acid functional monoethylenically unsaturated monomer, wherein said first shell polymer fully encapsulates said core polymer, wherein the ratio of the weight of said core polymer to the weight of said first shell polymer is from 1:2 to 1:100, and wherein said first shell polymer has a glass transition temperature greater than 50° C.; and (3) a second shell polymer formed from 93% to 99.9% by weight, based on the total weight of said second shell polymer, of at least one nonionic monoethylenically unsaturated monomer and from 0.1% to 7% by weight, based on the total weight of said second shell polymer, of an acid functional monoethylenically unsaturated monomer, wherein said second shell polymer is formed in the presence of said first shell polymer, and wherein said second shell polymer has a glass transition temperature lower than 15° C., and wherein said second shell polymer is at least 15% by weight of the total weight of said first shell polymer and said second shell polymer; and (b) neutralizing said particles formed with a base so as to swell said core and form particles containing a void; and (c) drying said sheet of paper or paperboard.

* * * * *